(12) United States Patent
Molyneux et al.

(10) Patent No.: US 12,097,808 B2
(45) Date of Patent: Sep. 24, 2024

(54) MASCOT RETRACTION MECHANISM

(71) Applicant: BENTLEY MOTORS LIMITED, Crewe (GB)

(72) Inventors: David Molyneux, Shavington (GB); Steve Crowe, Crewe (GB); Paul Wentworth, Leek (GB)

(73) Assignee: BENTLEY MOTORS LIMITED, Crewe (GB)

( * ) Notice: Subject to any disclaimer, the term of this patent is extended or adjusted under 35 U.S.C. 154(b) by 384 days.

(21) Appl. No.: 17/618,399

(22) PCT Filed: Jun. 5, 2020

(86) PCT No.: PCT/GB2020/051362
§ 371 (c)(1),
(2) Date: Dec. 10, 2021

(87) PCT Pub. No.: WO2020/249930
PCT Pub. Date: Dec. 17, 2020

(65) Prior Publication Data
US 2022/0274536 A1    Sep. 1, 2022

(30) Foreign Application Priority Data
Jun. 10, 2019 (GB) .................................... 1908222

(51) Int. Cl.
*B60R 13/00* (2006.01)

(52) U.S. Cl.
CPC ............ *B60R 13/005* (2013.01); *B60R 13/00* (2013.01)

(58) Field of Classification Search
CPC ........ B60R 13/005; B60R 13/00; G09F 21/04

USPC ...... 248/503; 296/1.07, 115; 280/150 R, 762
See application file for complete search history.

(56) References Cited

U.S. PATENT DOCUMENTS

| | | | | |
|---|---|---|---|---|
| 3,588,016 A * | 6/1971 | Reinhard | ............ | B60R 13/005 403/111 |
| 3,813,113 A * | 5/1974 | Burnham | ............ | B60R 13/005 428/31 |
| 4,061,303 A * | 12/1977 | Ridgway | ............ | B60R 13/005 248/587 |
| 4,995,278 A * | 2/1991 | Huang | ............ | B60R 13/005 428/31 |
| 5,002,251 A | 3/1991 | Kranenberg | | |
| 5,052,714 A * | 10/1991 | Muscat | ............ | B60R 13/005 40/414 |
| 5,456,958 A * | 10/1995 | Crisler | ............ | B60R 13/005 280/727 |
| 11,724,653 B2 * | 8/2023 | Wilson | ............ | B60R 13/005 428/31 |

FOREIGN PATENT DOCUMENTS

DE    10200703762    2/2009

* cited by examiner

*Primary Examiner* — Nkeisha Smith
(74) *Attorney, Agent, or Firm* — SCHWABE, WILLIAMSON & WYATT, P.C.

(57) ABSTRACT

A mascot retraction mechanism has a mascot base 10 with a non-circular outline shape which extends over and conceals a contact area with a substantially circular edge. A support 6 comprising a support surface 22 is biased into contact with the contact area of the mascot base permitting the mascot base to pivot relative to the support about the substantially circular edge. Such pivoting may operate a release mechanism causing retraction of a mascot.

15 Claims, 18 Drawing Sheets

MASCOT RETRACTION MECHANISM

CROSS-REFERENCE TO RELATED APPLICATION

This application is a 371 U.S. National Stage of International Application No. PCT/GB2020/051362, filed Jun. 5, 2020, entitled "MASCOT RETRACTION MECHANISM," which designated, among the various States, the United States of America, and which claims priority to GB 1908222.1, filed Jun. 10, 2019, both of which are hereby incorporated by reference.

TECHNICAL FIELD OF THE INVENTION

The present invention relates to a mascot retraction mechanism, in particular for an automobile.

BACKGROUND TO THE INVENTION

Regulations require that certain ornaments which project from vehicles retract, detach or bend over when a specified minimum force is applied in a plane approximately parallel to the surface on which they are mounted.

U.S. Pat. No. 4,061,303 discloses an arrangement for automatically retracting a mascot mounted to a radiator shell of a vehicle. The mascot rises upwards from a circular base. The edge of the underside of the base is flat and is urged onto an annular supporting surface by a spring loaded rod connected to the underside of the base. A finishing ring surrounds the annular supporting surface. When a lateral force is applied to the mascot it causes it to tilt, the edge of the circular base hinging against the annular surface and/or finishing ring. As the mascot hinges the spring loaded rod is moved against the spring force. Movement of the rod causes a mechanism to retract the mascot into the radiator shell. As the base is circular the mascot will retract when a similar minimum lateral force is applied to it in any direction. The retraction mechanism comprises pivotally mounted levers to which the mascot is attached. The levers move to retract the mascot into the radiator shell in a downward arc, leaving the tip of the mascot protruding from the radiator shell. The mascot is returned to its original position manually by rotating a nut with a spanner.

There are a number of disadvantages with this arrangement. The need for a circular base imposes limitations on the design of the mascot. The retraction mechanism occupies a significant amount of space to the side of the space directly beneath the mascot into which the mascot retracts. Part of the mascot continues to protrude from the radiator shell after retraction which is unsightly and exposes the mascot to tampering or theft, even when retracted. Arranging for the mascot to fully retract would likely involve the retraction mechanism occupying additional space. Returning the mascot to its original position involves manual intervention, which is inconvenient.

It is an object of embodiments of the present invention to address some of all of these problems.

SUMMARY OF THE INVENTION

According to a first aspect of the present invention there is provided a mascot retraction mechanism comprising a mascot base with a non-circular outline shape, the base extending over and concealing in use a contact area with a substantially circular edge, a support comprising a support surface and an arrangement for resiliently biasing the contact area of the mascot base into contact with the support surface permitting the mascot base to pivot relative to the support about the substantially circular edge.

This allows the shape of the mascot base to be any non-circular desired shape, whilst permitting the mechanism to be responsive to lateral forces which tilt a mascot with equal sensitivity from all directions.

The mascot base may for example have a generally polygonal shape, such as square, rectangular, diamond shaped, trapezoidal or hexagonal such as a coffin shape. The shape may have curved corners and may be elongate.

The substantially circular edge may have an angular profile, such as a right angle formed at the edge of a disc or raised circular surface. Or, the substantially circular edge has a curved profile, such as by the surface of an annular ring with a U-shaped cross-section, or by a substantially circular ridge raised on a surface.

The contact area and/or the support surface may be annular or circular. The contact area may be formed only by the substantially circular edge.

The substantially circular edge is formed integrally with the mascot base or comprised in a pivot member connected to the mascot base.

Respective co-operating formations associated with the mascot base and the support may be provided which cooperate to locate the mascot base in a desired position relative to the support when the contact area is biased into contact with the support surface. The formations may comprise respective male and female members, such as a protrusion with a non-circular cross-section which is received into an aperture, or a ring with a generally u-shaped cross section which is received into a circular channel with a corresponding cross-section with one or more additional formations to provide rotational alignment.

The support may comprise an aperture of corresponding shape to the outline shape of the mascot base, and arranged so that the mascot base is located in and/or aligned with the aperture when the contact area is biased into contact with the support surface. In this case a clearance is preferably provided between the edge of the mascot base and the aperture, and beneath the underside of the mascot base and the support, when the contact area is biased into contact with the support surface. This permits the mascot base to pivot relative to the support about the substantially circular edge.

The support may comprise a plinth and the aperture may be formed in the plinth.

The mascot retraction mechanism may be arranged so that sufficient pivoting of the mascot base relative to the support causes the mechanism to retract the mascot. In particular, the mascot base may be connected to or urged into contact with a member such that pivoting of the mascot base causes movement of the member, the member being operatively connected to a latch such that sufficient movement of the member causes the latch to release, and release of the latch permits the support to move from a mascot deployed position to a mascot retracted position. The member may comprise or be connected to a cable. The member may comprise or be connected to a push-rod and/or lever.

The support may be mounted to levers which permit its movement between mascot deployed and mascot stowed positions. The levers may be configured to form a parallel linkage. The latch may be operative to retain the levers in a mascot deployed configuration, and when released to permit movement enabling the support to move to the mascot stowed position.

The arrangement for resiliently biasing may be a resilient member such as a spring, in particular a helical spring. The mascot base may be biased downwards or upward to urge the contact area into contact with the support surface.

According to a second aspect of the present invention there is provided a mascot retraction mechanism comprising a support movably mounted to a track for movement between a mascot deployed position and a mascot stowed position.

A track may be positioned vertically beneath an aperture in a generally horizontal surface, such as the top of a radiator shell, through which it is intended to deploy a mascot. The mechanism can thus conveniently occupy space directly below the aperture. It can also provide for deployment and retraction of a mascot with a linear upright motion, which is thought to be aesthetically more pleasing than the curved paths provided by prior art systems.

The mascot retraction mechanism may comprise a biasing element arranged to resiliently bias the support towards one end of the track. This may be a resilient member such as a spring.

The mascot retraction mechanism comprising a drive mechanism arranged to drive the support along the track. In one embodiment the drive mechanism comprises two pivotally connected levers and an actuator arranged to pivot the two levers relative to each other thereby to move the support relative to the track. And it may comprise a carriage which is movably mounted to the track. There may be a releasable latch via which the drive mechanism drives the support. The latch may be releasable to enable the support to move along the track free of the drive mechanism. The latch may be mounted to the support and arranged to engage with the carriage thereby permitting the carriage to drive the support along the track. Unless released, the latch may permit the carriage to move along the track past the carriage in one direction but not the opposite direction. A release mechanism may be provided arranged to release the latch when a mascot mounted on the support is tilted.

Any other suitable drive mechanism may be employed to move the support along the track. This may comprise a belt or chain drive or a piston and cylinder assembly. In all cases though it is desirable that the drive mechanism may be decoupled from the support by a release mechanism in response to tilting of a mascot mounted to the support.

A cover may be arranged to close an aperture through which a mascot has been retracted. The cover may be mounted to a lever mechanism which is operated by a follower which bears on a drive surface or surfaces of the support.

The mascot retraction mechanism may be arranged so that when the support moves to the mascot stowed positon the door moves to closed position and is locked against movement from the closed position whilst the support for a mascot remains in the retracted position.

The lever mechanism may be arranged so that when the support moves the mascot from the mascot stowed position to the mascot deployed position the cover is moved downwards and to one side of the aperture. This permits a mascot to be moved vertically between deployed and stowed positions.

The first aspect of the invention may include any or all of the features of the second aspect of the invention and vice versa.

DETAILED DESCRIPTION OF THE INVENTION

In order that the invention may be more clearly understood one or more embodiments thereof will now be described, by way of example only, with reference to the accompanying drawings, of which:

FIG. 1 is a cross-section of part of a mascot retraction mechanism;

FIG. 2 corresponds to FIG. 1 showing operation of the release mechanism;

Figure 19:
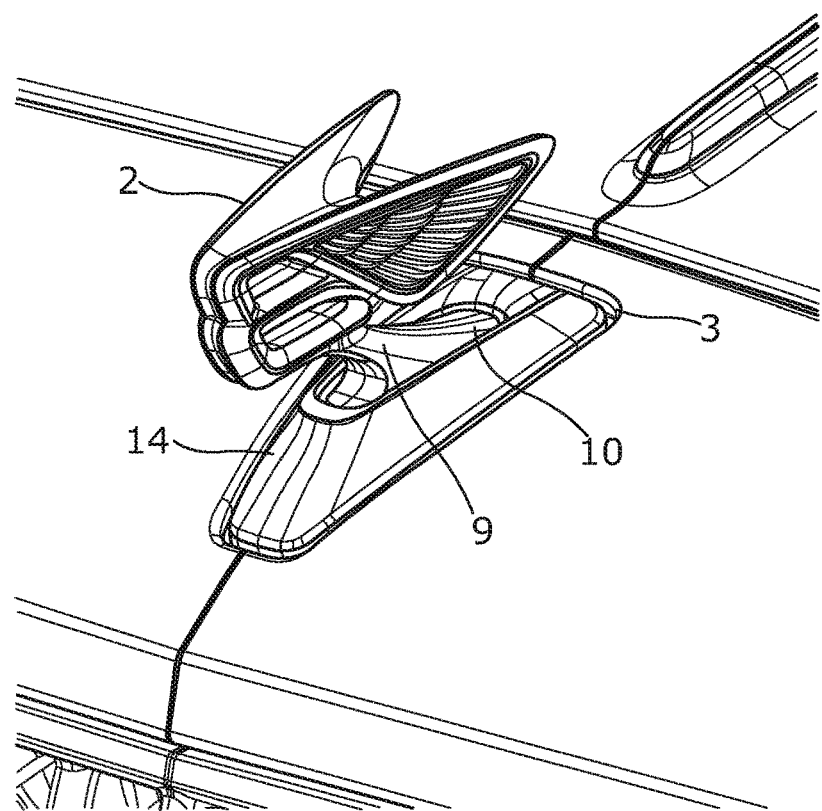
FIG. 19 is a perspective view of the top of a radiator shell of a vehicle with mascot deployed.
Figure 20:
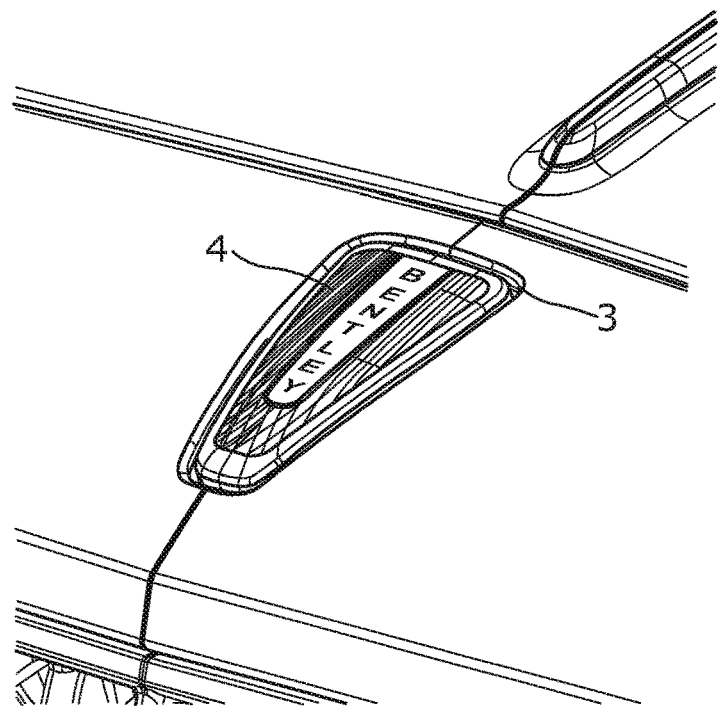
Figure 21:
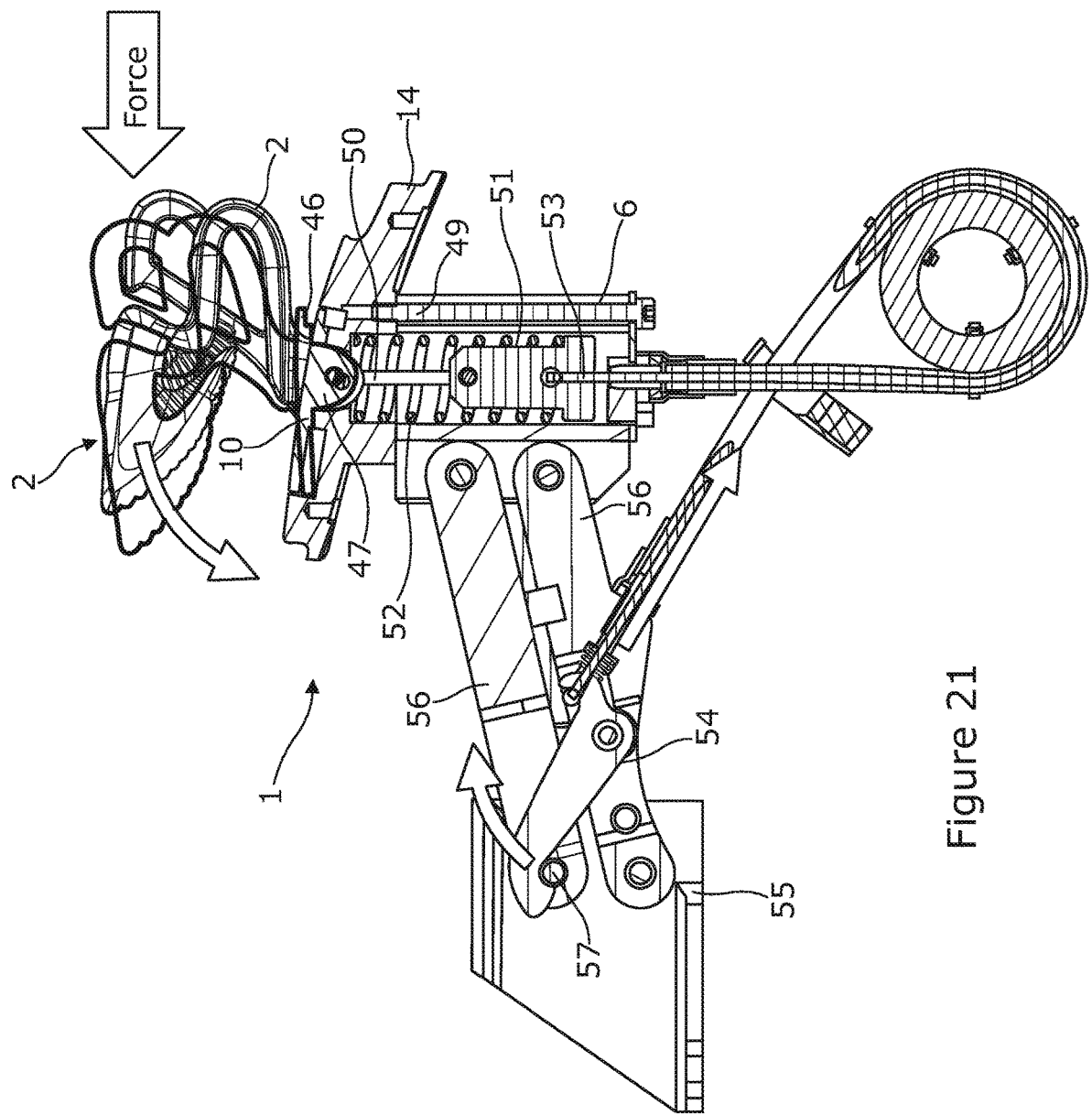
Figure 22:
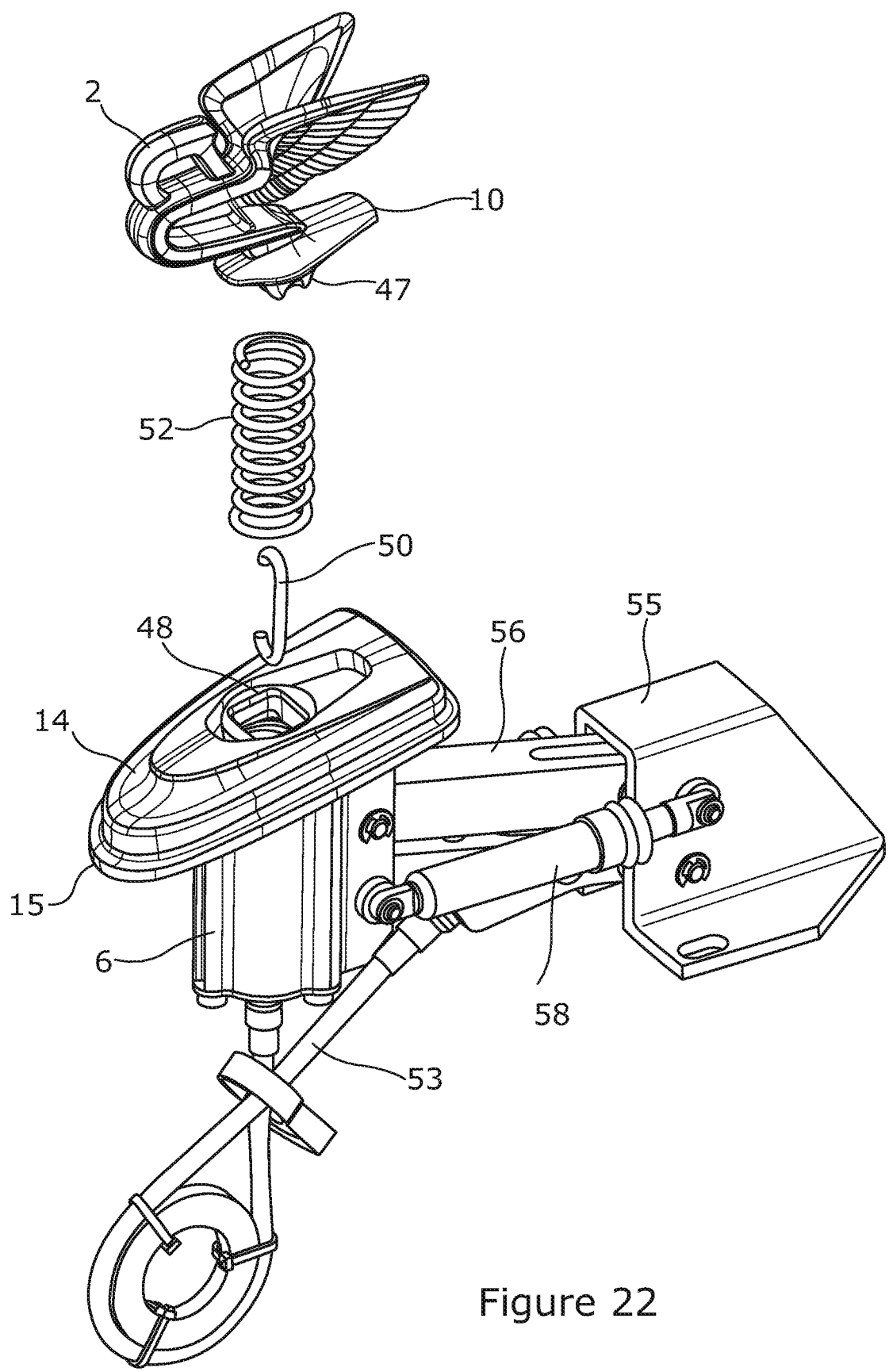
Figure 23:
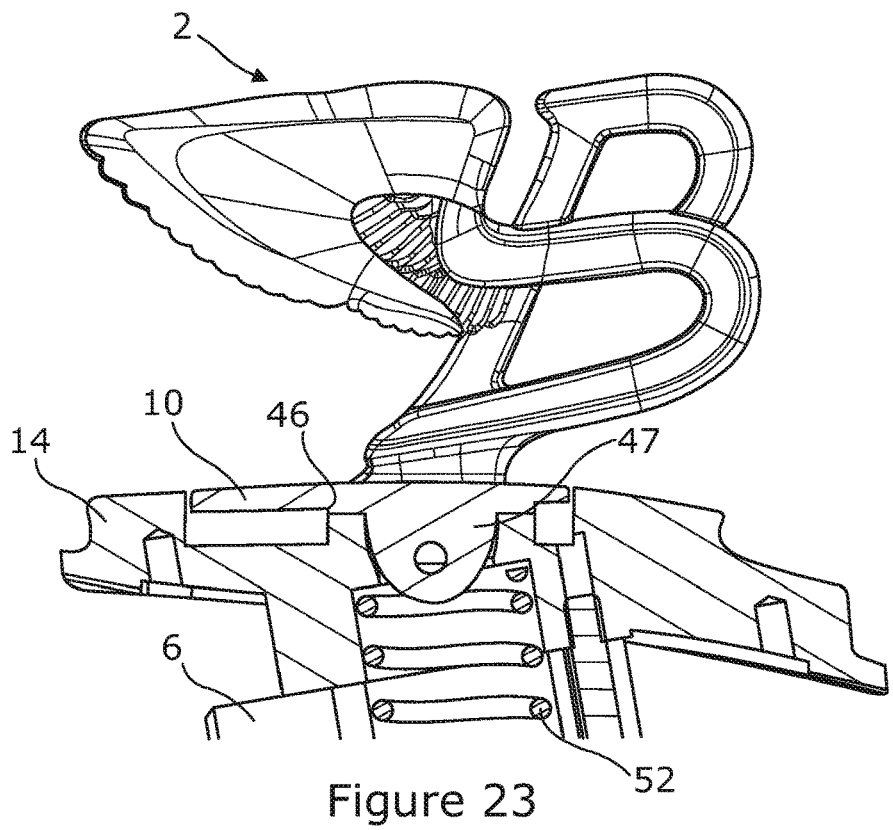
Figure 24:
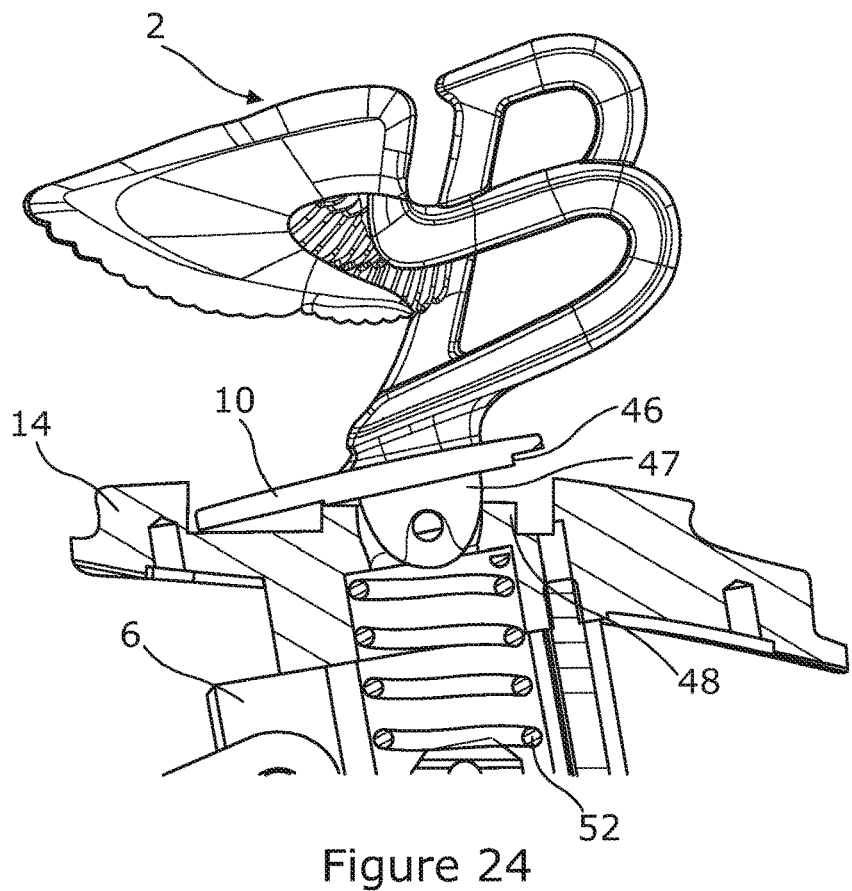

FIG. 20 corresponds to FIG. 19 with the mascot stowed;

FIG. 21 is a cross-section of another mascot retraction mechanism, showing operation of the mechanism;

FIG. 22 is a partially exploded perspective view of the mechanism of FIG. 21;

FIG. 23 is a cross-section of the top of the retractable mascot mechanism of FIG. 21;

FIG. 24 corresponds to FIG. 21 showing operation of the mechanism; and

Figure 25:
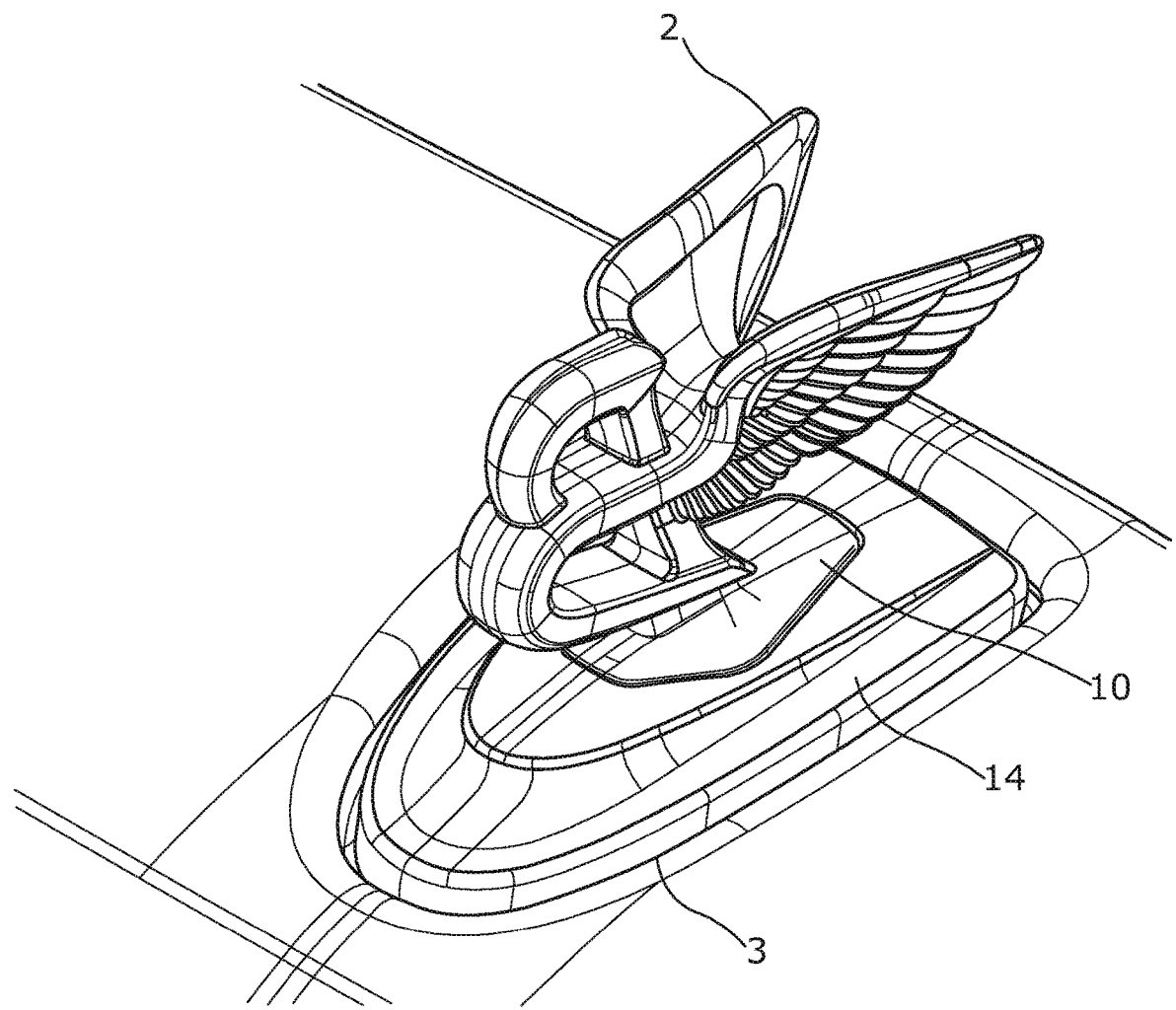

FIG. 25 is a perspective view of the mascot retraction mechanism of FIG. 21 mounted to a radiator shell of a vehicle.

In what follows the terms up, down, top, bottom and like terms are used to refer to the described apparatuses in the orientation shown in the drawings, which is the orientation in which it is intended to be used, but should not be taken as otherwise limiting. Like reference numerals are used to denote like features throughout the drawings, but should not be taken as otherwise limiting.

Figure 12:
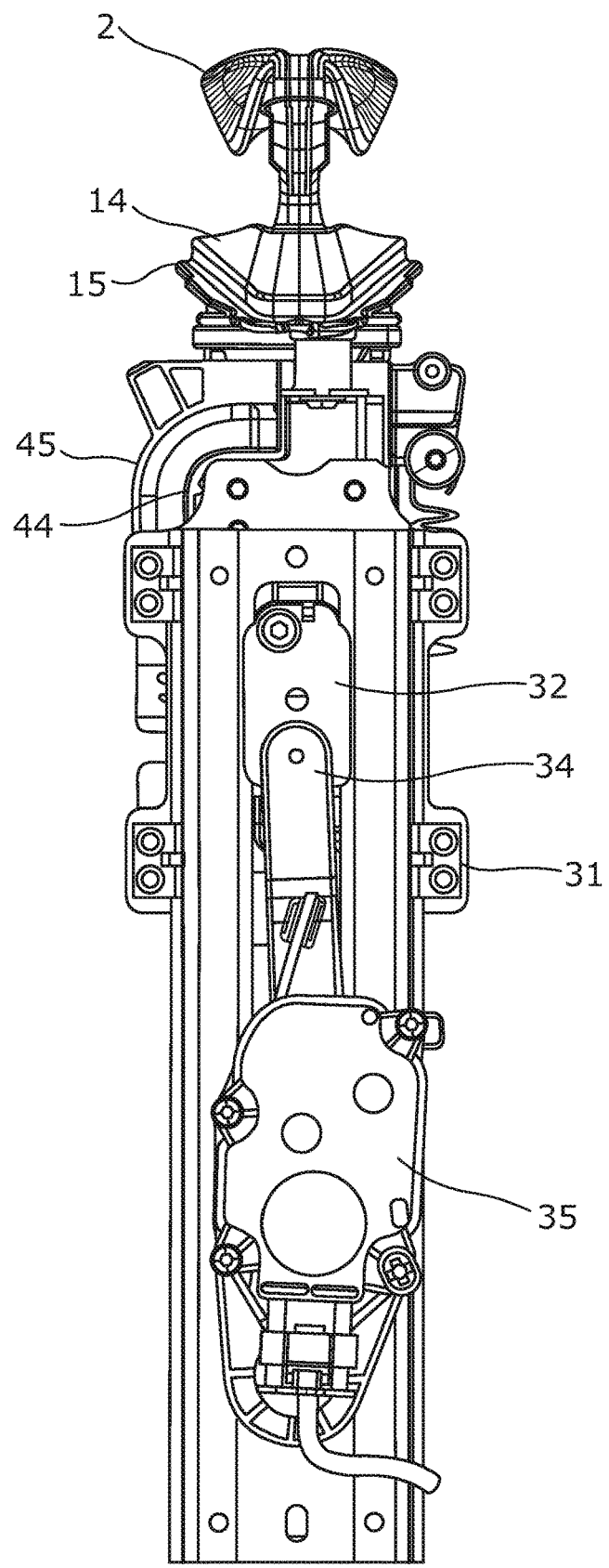
FIG. 12 is a front view of the arrangement of FIG. 8, in the mascot deployed position.
Figure 13:
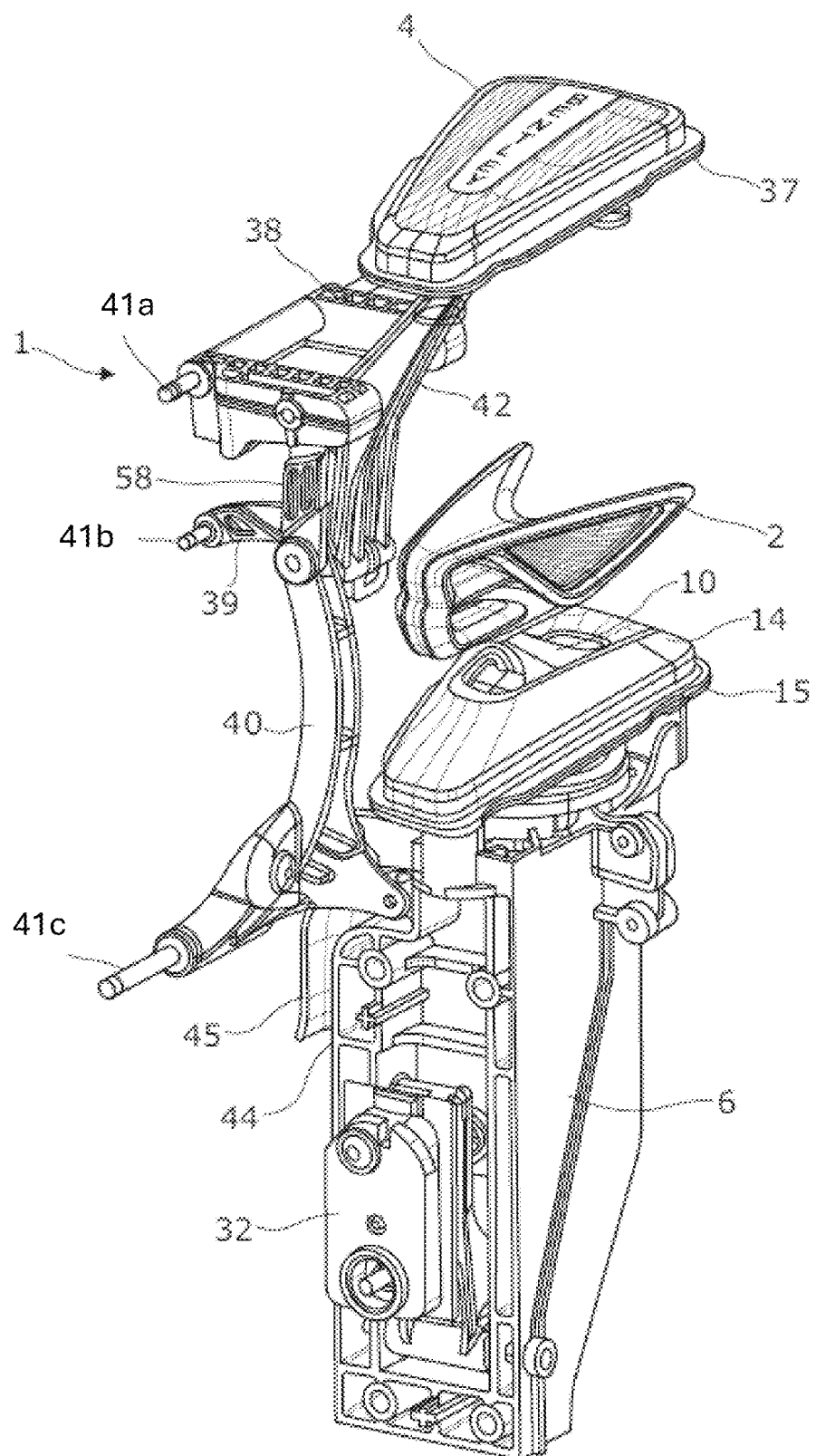
FIG. 13 is a perspective view of arrangement of FIG. 8, in the mascot deployed position, together with a mascot cover mechanism.
Figure 14:
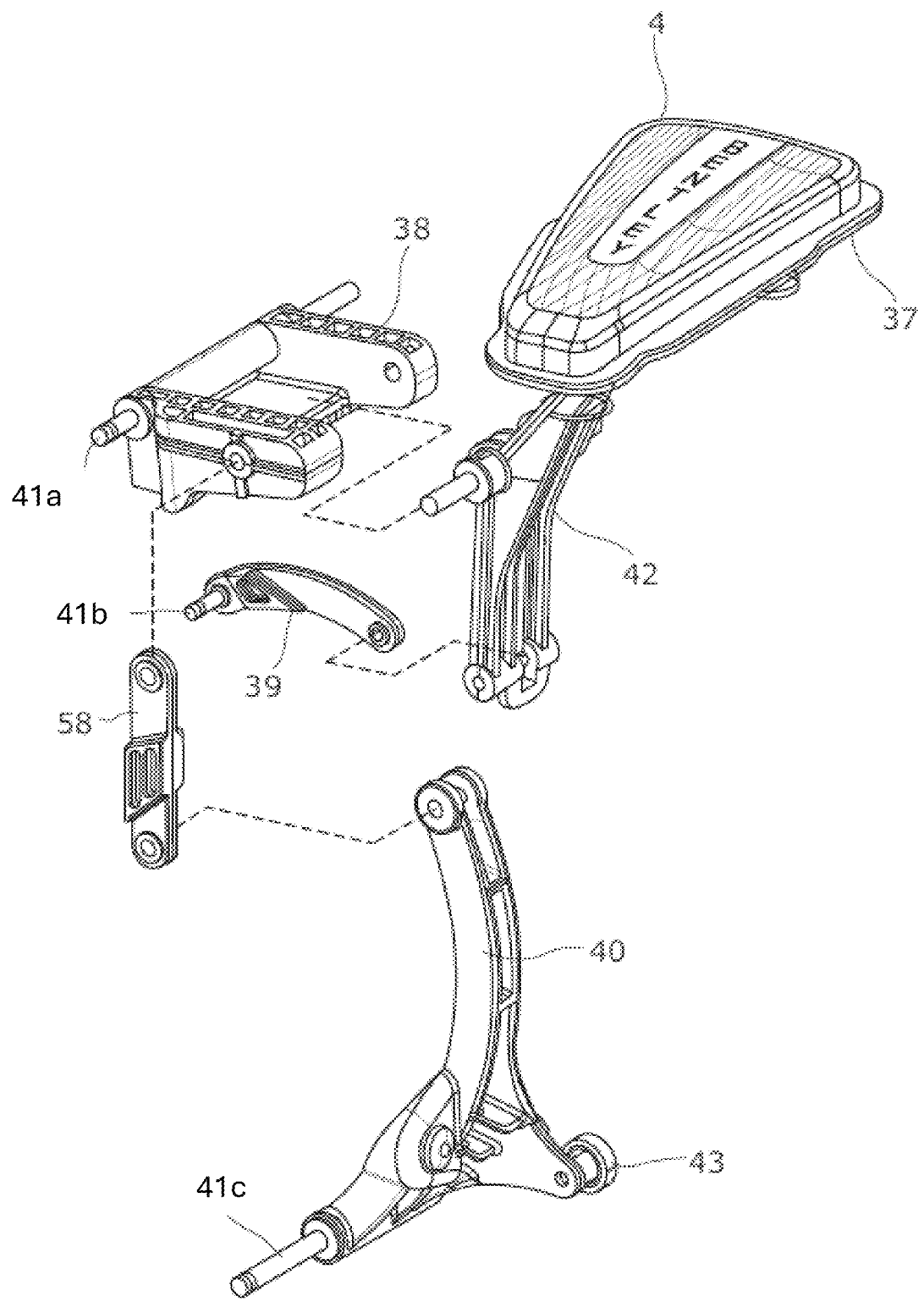
FIG. 14 is an exploded perspective view of the mascot cover mechanism of FIG. 13.
Figure 15:
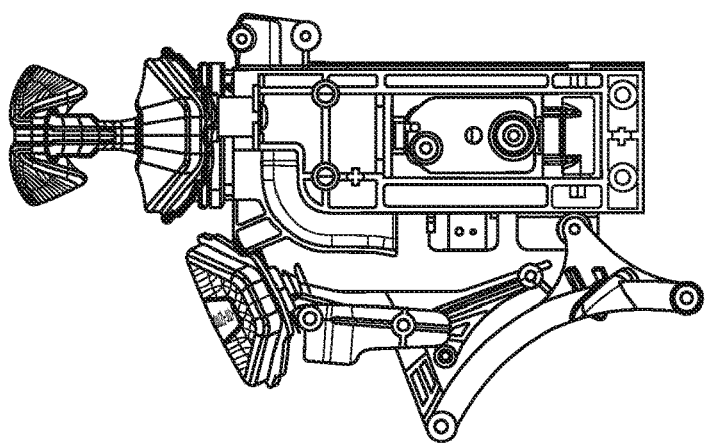
FIG. 15 is a front view of the arrangement of FIG. 13, in a mascot deployed position.

Referring initially to FIGS. 1 to 20, these show a mascot retraction mechanism 1 best shown in FIG. 13. The mechanism is mounted to mount a mascot 2 to the radiator shell of an automobile and operable to move the mascot 2 between a deployed position, shown in FIG. 19, where it protrudes through an aperture 3 in the radiator shell and a stowed position where mascot is withdrawn, via the aperture 3, into the radiator shell, and to close the aperture 3 in the radiator shell with a cover 4. The mechanism enables a user to selectively move the mascot between the deployed and stowed positions, and automatically moves the mascot from the deployed position to the stowed position when the mascot is subjected to at least a minimum lateral force, that is to say having at least a component in a plane approximately parallel to the surface on which it is mounted.

The retraction mechanism comprises a track 5 which is mounted generally vertically beneath the aperture 3 in the vehicle radiator shell. A support 6 is movably mounted to the track. A drive mechanism 7 is mounted to the track 5 and the support 6, operable to move the support 6 up and down the track 5. The support 6 supports the mascot 2 and includes a release mechanism which releases the support from the drive mechanism when the mascot 2 is tilted, allowing the support 6 to move down the track 5 under the influence of gravity, augmented by force provided by a retraction spring 36. The cover 4 is mounted to a cover deployment mechanism which interacts with the support 6 to cause the cover 4 to close the aperture 3 in the radiator shell when the support 6 moves towards the bottom of the track 5, and to open the aperture 3 when the support 6 moves towards the top of the track 5.

The illustrated retraction mechanism will now be described in greater detail.

The mascot 2 comprises a stylised, forward facing capital letter B from the rear of which extends two feathered wings. The wings are at least partially formed from a semi-transparent material. A lamp or lamps 8 (such as LEDs) are positioned to the rear of the letter B to illuminate the wings.

The mascot 2 also comprises a pedestal 9 extending downward and backwards from the rear of the bottom of the letter B. Away from the B the pedestal 9 thickens and extends into a base 10. The base 10 has a generally trapezoidal outline shape with rounded off corners and a flat underside.

An electrical wire 11 is connected to the lamp 8 and extends from it through the letter B and pedestal 9, downwards and backwards, and exits the body of the mascot through the bottom surface of the base 10 and connects to a power supply (not shown) within the radiator shell, thereby to power the lamp 8.

A generally cylindrical column 12 extends from the bottom surface of the base 10. Four radially projecting tabs 13 are evenly spaced around the column, forming a cross. The bottom of each tab is generally rectangular with a lower edge flush with the bottom of the column. The top of each tab is triangular. There are two mirror opposite, shorter, laterally extending tabs, and two mirror opposite, longer, longitudinally extending tabs.

The mascot 2 is mounted to a plinth 14 which is in turn mounted on top of the support 6. The plinth has 14 a body with an outline generally trapezoidal shape with rounded corners that corresponds to the outline shape of the base of the mascot. A flange 15 extends around the outside of the lower edge of the body 14. The shape of the aperture 3 in the radiator shell corresponds to that of the plinth 14. When the support is moved to its uppermost position on the track, to move the mascot 2 to its deployed position, the body of the plinth partially projects out of the aperture. The flange 15 slightly exceeds the dimensions of the aperture 3 and remains within the radiator shell.

The plinth 14 defines a passage which extends there through. The top of the plinth is slightly concave. Within this concavity there is a generally trapezoidal aperture with rounded corners which broadly corresponds in shape to and is aligned with both the outline shape of the plinth and that of the base 4 of the mascot 2. The aperture is slightly larger than the base 4 of the mascot so that the base of the mascot can be received into the aperture with a slight clearance all around. The plinth further defines a ring 16 which projects into the passage at a position spaced beneath the edge of the trapezoidal aperture. The ring has an inverted U-shaped cross-section which opens out at diametrically opposed lateral positions to form a part spherical, concave shape and defines a generally circular opening.

The column 12 of the mascot extends through the ring 16 where it connects to a pivot member 17. The pivot member 17 comprises an annular body defining a central generally circular opening. Ribs 18 extend in the opening to define a smaller central, generally circular, opening with four evenly spaced radial slots extending off, into which is received the column 12 and tabs 13 of the mascot rotationally fixing the mascot to the pivot member 17. The pivot member has a flat annular base the central opening through which has a diameter of about half that of the column 12. A fastener 19 extends through the central aperture of the pivot member 17 into a central aperture in the column 12 fastening the column, and thus mascot 2, to the pivot member 17. The top of the annular body of the pivot member 17 is slightly domed and includes two diametrically opposed part spherical formations so that it fits and rotationally locates into the underside of the ring 16. To the bottom of the annular body there is a radially outwardly extending flange having a substantially circular edge. The underside of the flange, and that of the remainder of the pivot member is substantially flat save for a raised substantially circular ridge 20 at the periphery of the flange. This provides a contact area with a substantially circular edge. Spacing between the underside of the base 10 of the mascot 2 and the top of the pivot member 17 is such that the mascot floats within the plinth 14.

Fasteners 21 secure the plinth to the top of the support 6. A passage extends through the support at the top of which is housed a plunger 22. The plunger has a generally cylindrical lower part above which there is a frustroconcial part with a greater diameter towards its flat top from which a radial flange projects to form a substantially flat annular support surface surrounding a central recess. A blind bore with counter bore extends up from the bottom of the plunger along its long axis. The plunger 22 is supported in the support body by two curved perpendicular links 23, each pivotally connected to the plunger and to the support 6 allowing the plunger 22 to move axially up and down within the passage in the support 6.

Figure 1:
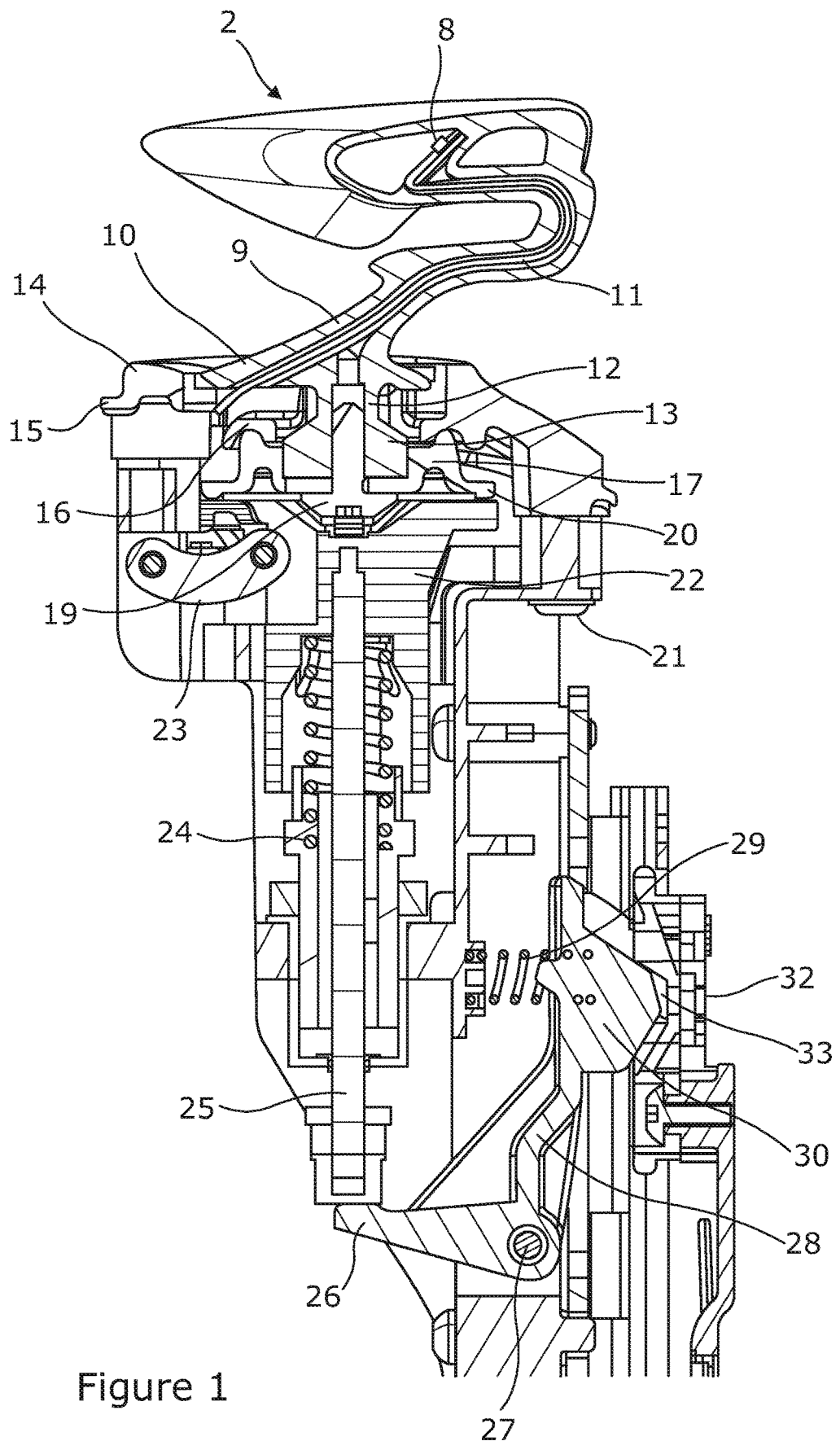

A helical spring 24 is positioned in the counter-bore in the plunger 22 and bears between the plunger 22 and support 6 to urge the plunger upwards and into contact with the pivot member 17. This in turn urges the top of the pivot member 17 into contact with the ring 16 of the plinth 14. This locates the base 4 of the mascot 2 correctly both laterally and vertically within the plinth 14, as shown in FIG. 1, with the top of the base generally flush or slightly recessed into with the edge the aperture in the plinth and a clearance between the bottom of the base 4 and the top of the ring 16.

An elongate cylindrical push rod 25 is fitted into the blind bore in the plunger 22 and extends through the helical spring 24 to bear against an generally horizontally extending arm 26 of a bell-crank pivotally mounted to the support at pivot 27. The bell crank has an upright arm 28. A helical spring 29 located by a protrusion on the upright arm 28 is positioned between this and the support 6, biasing the upright arm 28 away from the support 6 and thus biasing the horizontal arm against the push rod 25. On the opposite side of the upright arm 28, facing away from the support 6, is a latch member 30 with a lower generally horizontal surface and an upper top surface consisting of by two side by side sloping surfaces one more steeply raked than the other.

The track 5 is comprises an elongate rectangular body with an elongate rectangular open therein, the long sides of the opening being parallel to the long outer edges of the body. Four runners 31 on the support 6 slidably mount it to the opposite outside edges of the track 5 allowing it to travel up and down the track 5, with the latch member 30 projecting towards the track. A carriage 32 is mounted to the opposed inside edges to travel up and down the track 5. The carriage 32 comprises a body which defines a recess 33 for receiving the latch member 30. The recess is shaped to confirm to the latch member with a close fit. When the latch member is received into the recess the support 6 will move up and down the track 5 with the carriage 32.

The carriage 32 forms part of a drive mechanism. A first elongate drive crank 34 is pivotally connected to the carriage at one end. At its opposite end a splined shaft connects to an output drive of an electric motor and gearbox assembly 35. The motor and gearbox assembly comprises a housing and the output drive is disposed at one end of the housing. The housing forms a second crank and is pivotally connected to the track 5 at its end opposite to where the output drive is located. Operation of the motor causes the two cranks 34, 35 to be pivoted relative to one another driving the carriage 32 along the track 5. The gearbox is self-locking (or a brake could be provided) so as to lock the carriage 32 in any desired position along the track.

One end of the retraction spring 36 is connected to the support 6 and the other to a fixed position in the vehicle beneath the support's lowest position, biasing the support downwards.

The cover 4 takes the form of a plug, shaped to fit closely in the aperture 3 in the radiator shell, with a flange 37 extending around its lower edge which slightly exceeds the size of the aperture 3. The cover is mounted to a cover mechanism, best shown in FIGS. 13 and 14.

The cover mechanism comprises a type of four bar linkage. The linkage comprises a pair of upper 38 links, a lower 39 link and a drive lever 40. Each of the upper links 38, lower link 39 and drive lever 40 comprise a lever 41a,b,c (respectively) pivotally mounted to a respective fixed position in the vehicle at one end, the drive lever being mounted below the lower link which is mounted beneath the upper links. The cover 4 is mounted to a carrier comprising an elongate arm extending from the underside of the cover 4. The free end of the carrier is pivotally connected to the free end of the lower link 39. The free end of the upper arm is pivotally connected to a point on the carrier between its ends. The free end of the drive lever 40 is pivotally connected to one end of a drive link 58, the opposite end of which is pivotally connected to a point about midway along the length of one of the upper links 38.

The linkage is arranged so that pivoting of the drive lever 40 away from the support 6 causes the carrier to move the cover 4 from a deployed position, where it sits in the aperture 3 in the radiator shell, downwards out of the aperture and to one side of it, and vice versa.

The drive lever 40 is elongate and arcuate. About a third of the way along the lever from its fixed pivot there is a projecting arm to which is mounted a follower wheel 43, the axis of rotation of which is parallel to the axes of rotation of the arm's pivotal connections. The follower wheel 43 is positioned to bear against an adjacent drive surface 44 on a side of the support 6 and is sized to be received into a channel defined between the side of the support and a guide wall 45 forming part of the support 6. The side wall 44 extends generally vertically over about three quarters of the height of the support 6 from its base, and then curves to a horizontal portion. The guide wall 45 is parallel and spaced apart from the side wall 44 and extends around the curve and a short distance either side of the curve. The drive surface of the support 6 and the guide wall 45 are shaped to that as the support 6 moves up and down the track 5 the drive lever 40 is moved through an arc.

Figure 10:
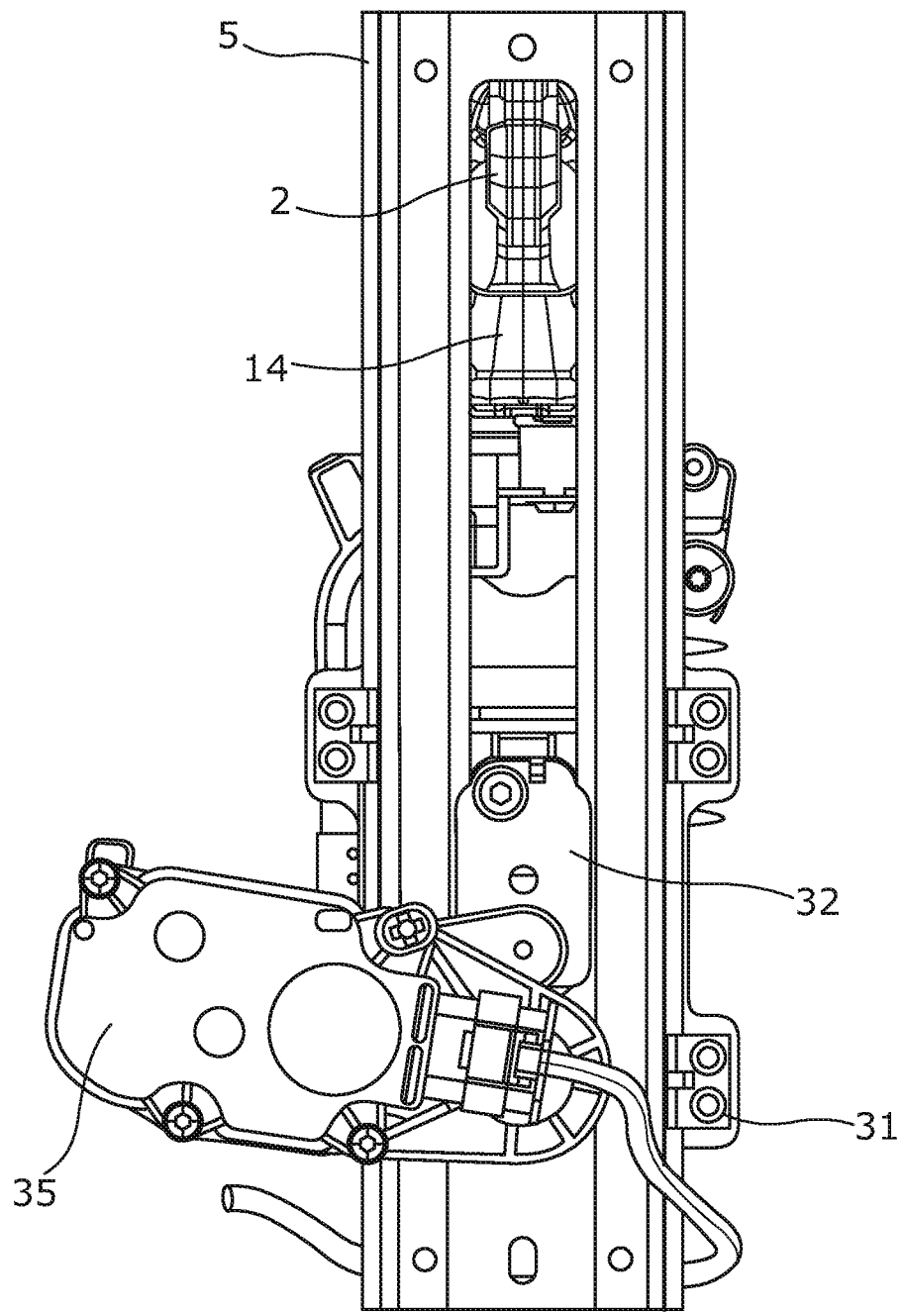
FIG. 10 is a front view of the arrangement of FIG. 8, in a mascot stowed position.
Figure 11:
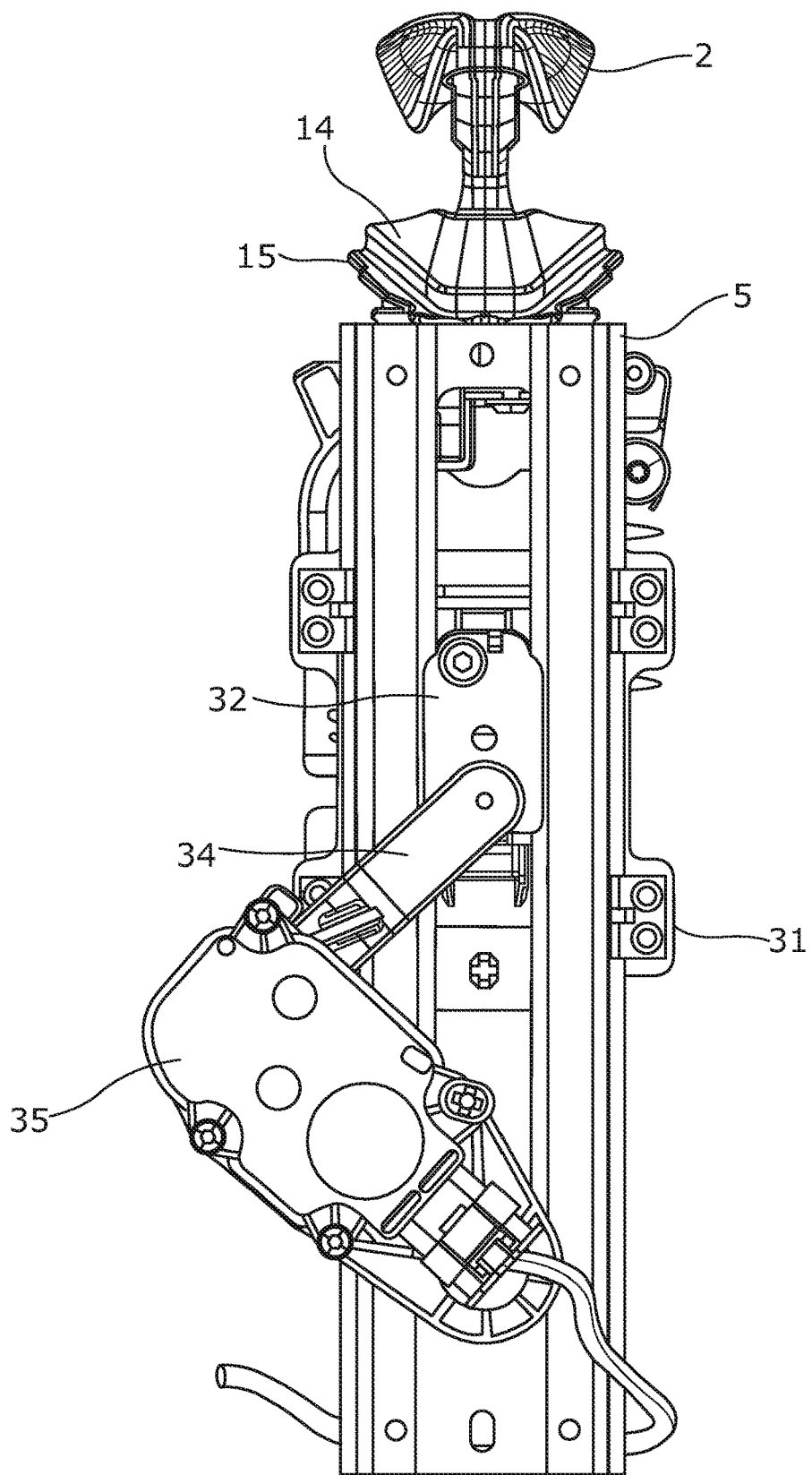
FIG. 11 is a front view of the arrangement of FIG. 8, part way between the mascot stowed position and mascot deployed position.
Figure 18:
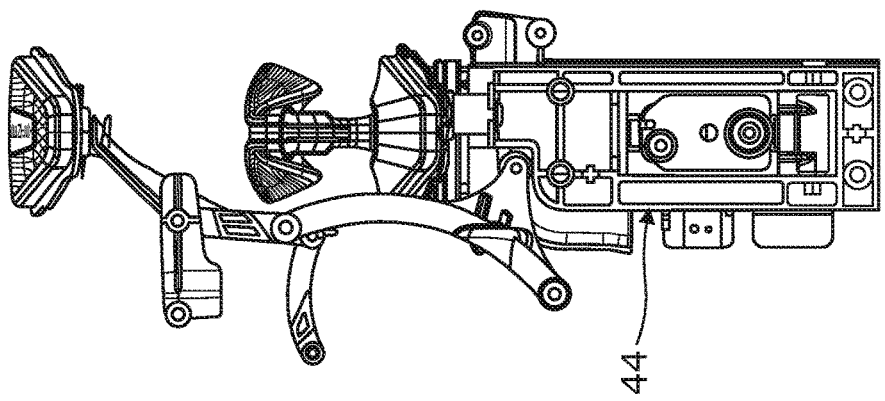
FIG. 18 is a front view of the arrangement of FIG. 13, in the mascot stowed position.

When the mascot 2 is in the stowed position, shown in FIGS. 10, 13 and 18 the carriage 32 and support 6 are in their lowermost positions on the track 5. The mascot 2 and plinth 14 are withdrawn into the radiator shell and the aperture 3 is closed by the cover 4. In this state the follower wheel 43 is captured between horizontal part of the drive surface 44 of the support 6 and a lower surface of the guide wall 45. This prevents movement of the drive lever 40 and thus locks the cover 4 in place.

Figure 16:
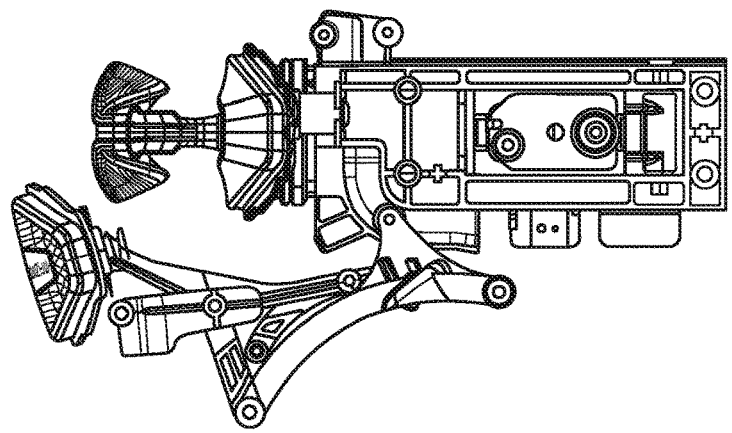
FIG. 16 is a front view of the arrangement of FIG. 13, between the mascot deployed and mascot stowed positions.
Figure 17:
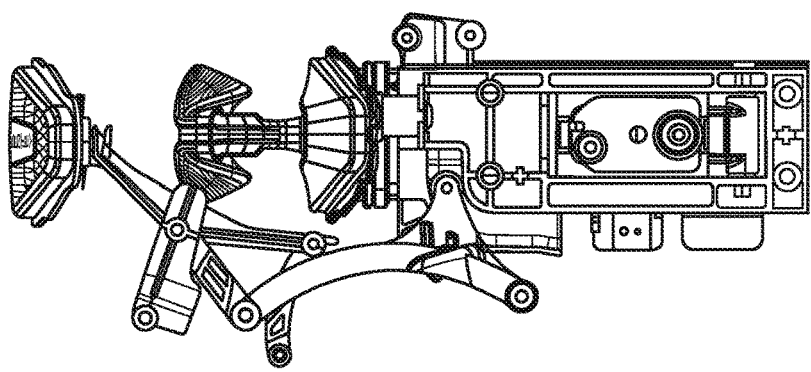
FIG. 17 is a front view of the arrangement of FIG. 13, between the mascot deployed and mascot stowed positions.

To deploy the mascot the motor drive is actuated to drive the carriage 32 up the track 5. Since the latch member 30 is received into the recess 33 in the support 6 the carriage 32 moves the support 6 up the track 5. Initial movement of the support 6, as shown in FIGS. 17 and 16 causes the drive lever 40 to pivot, moving the cover 4 out of and clear from the aperture 3 when the follower wheel 43 is bearing against the vertical part of the drive surface 44 of the support 6. Continued operation of the motor raises the support 6, through the positions shown in FIGS. 8, 11 and 12 to an uppermost position where the mascot 2 and plinth 14 extend out of the aperture 3 in the radiator shell as shown in FIGS. 12, 13 and 19. At this position the motor is stopped, locking the mascot 2 and plinth 14 in position. Alternatively (or in addition) the motor may drive the levers to an over-centre position.

The mascot 2 may be deployed in response to a user command, or automatically when the vehicle being put into an operational state, such as starting the engine or turning an ignition switch to a particular position.

If it is desired to stow the mascot 2, for example when leaving the vehicle, the process is reversed. The motor operates to allow the carriage 32 and support 6 to descend down the track 5 retracting the mascot 2 into the radiator shell. As the support 6 reaches the bottom of its travel the follower wheel 43 of the drive lever 40 is captured between the guide wall 45 and side 44 of the support 6 causing the lever 40 to pivot and the cover 4 to return to plug the aperture 3.

Figure 2:
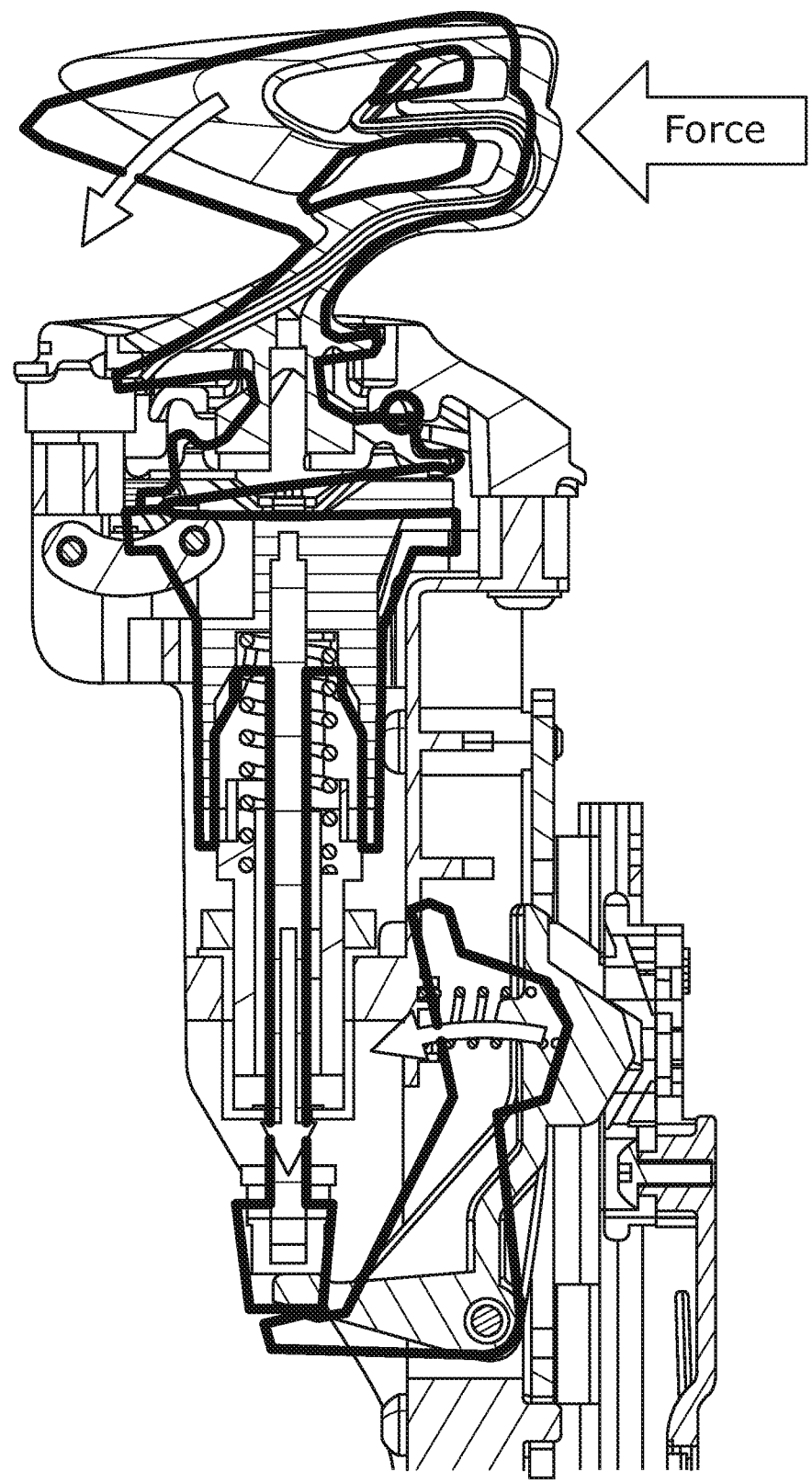
Figure 3:
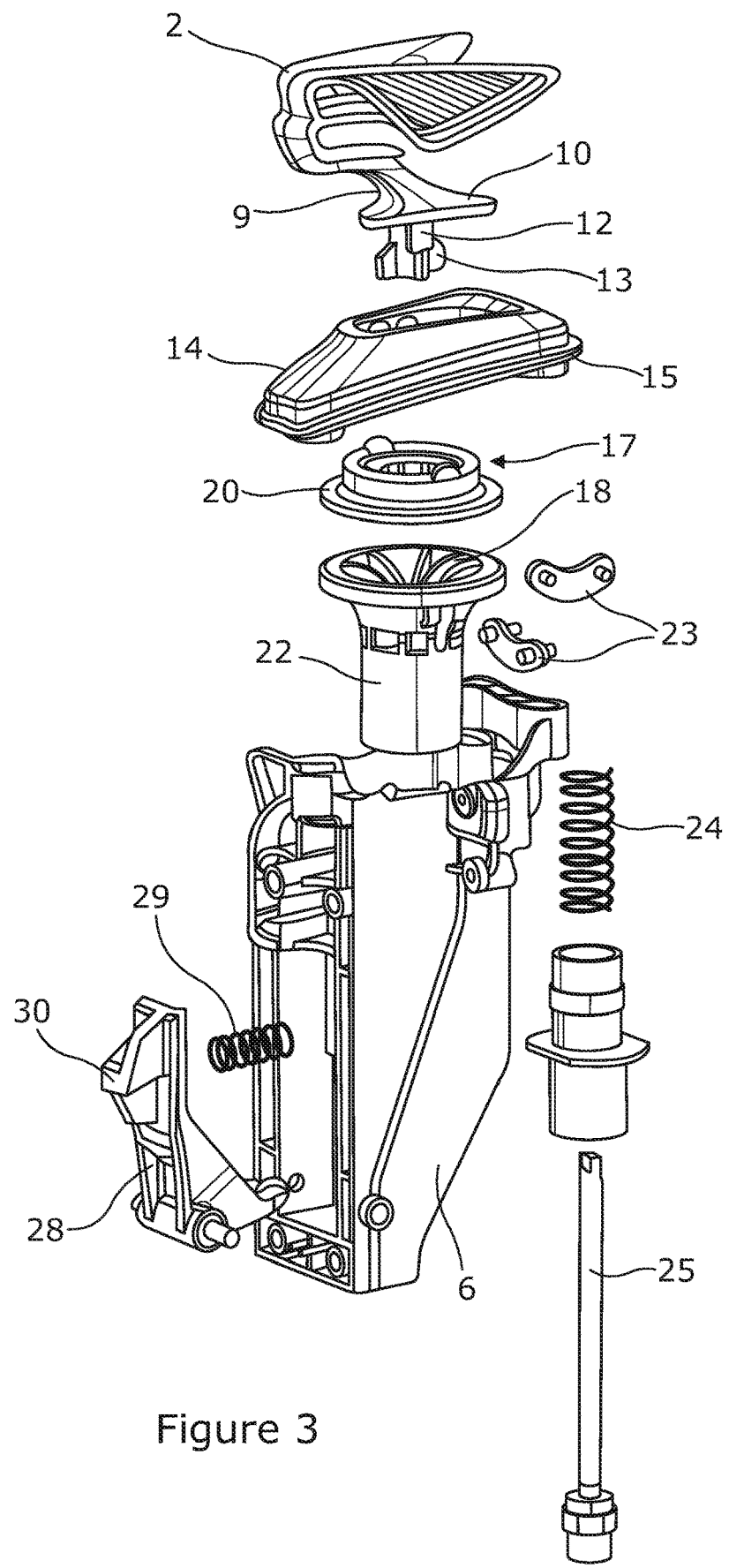
FIG. 3 is an exploded perspective view of the mechanism of FIG. 1.
Figure 4:
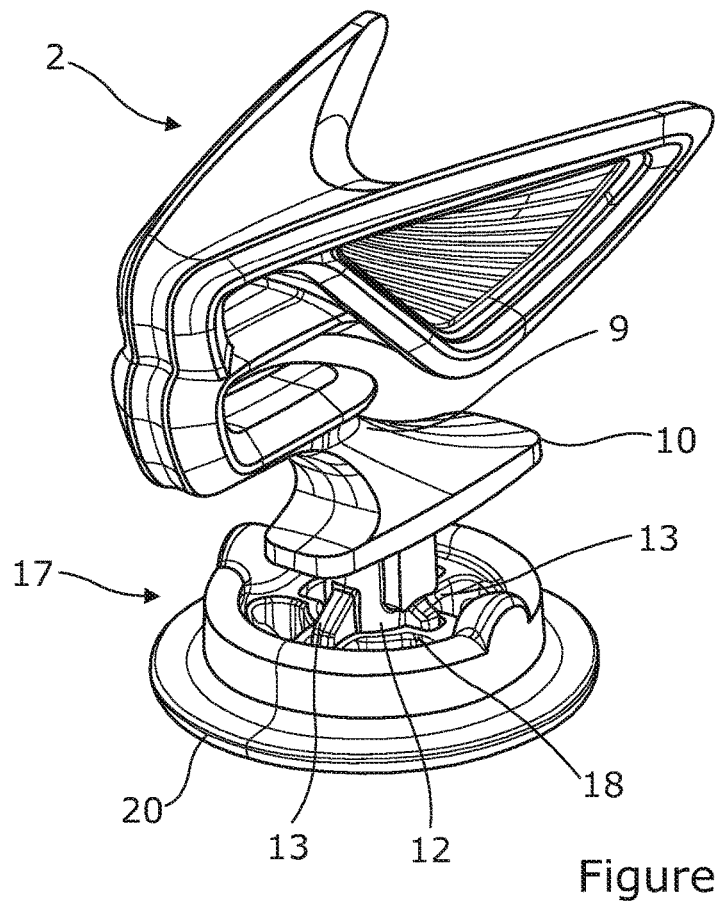
FIG. 4 is a perspective view of the mascot and pivot member FIG. 1.
Figure 5:
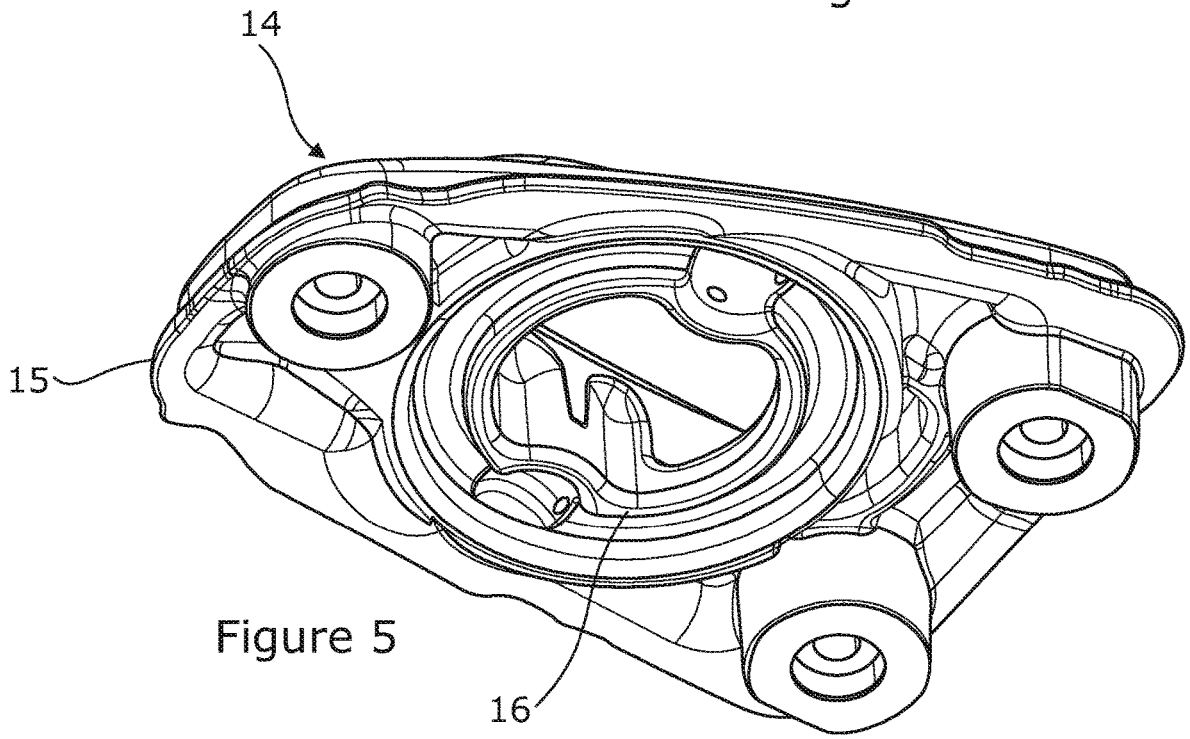
FIG. 5 is a bottom perspective view of the plinth of FIG. 1.
Figure 6:
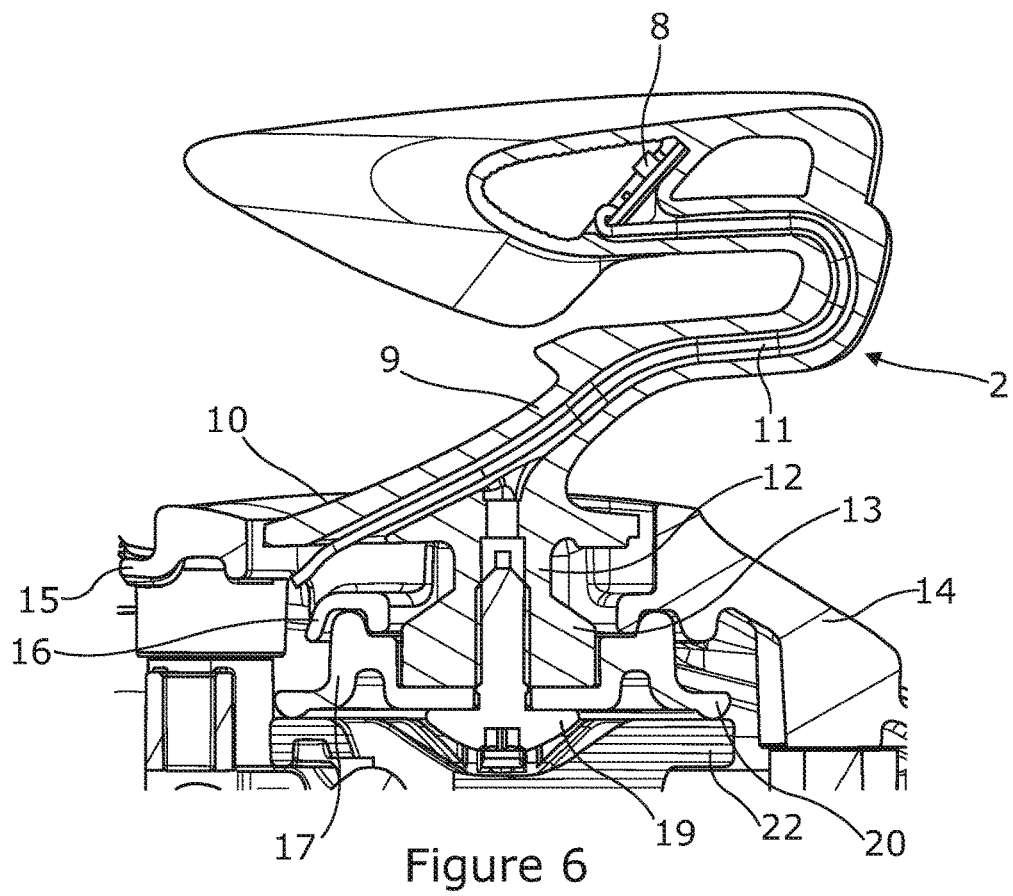
FIG. 6 is an enlarged cross-section of the top of the mechanism of FIG. 1.
Figure 7:
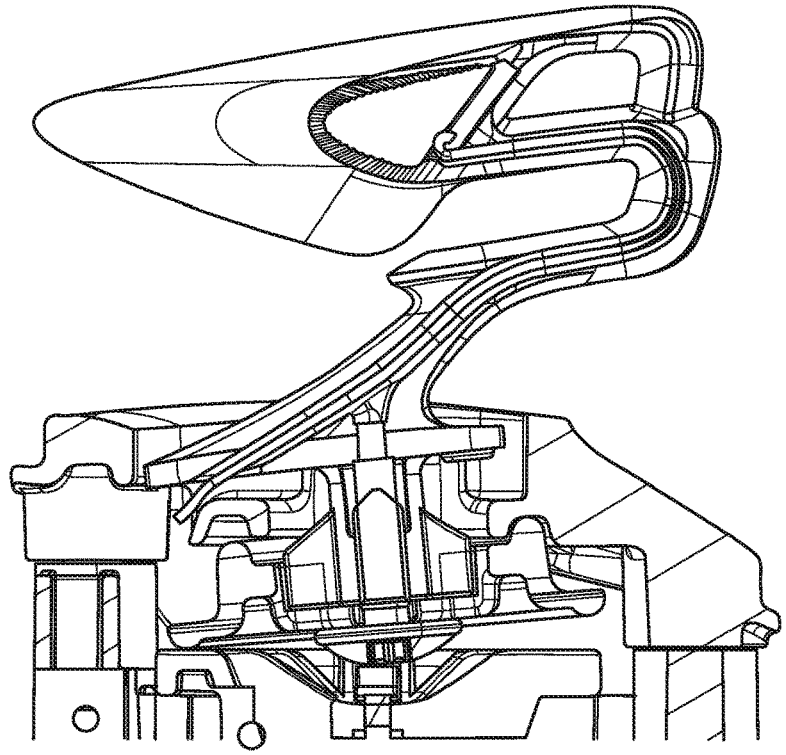
FIG. 7 is a corresponding view to FIG. 6, showing operation of the release mechanism.
Figure 8:
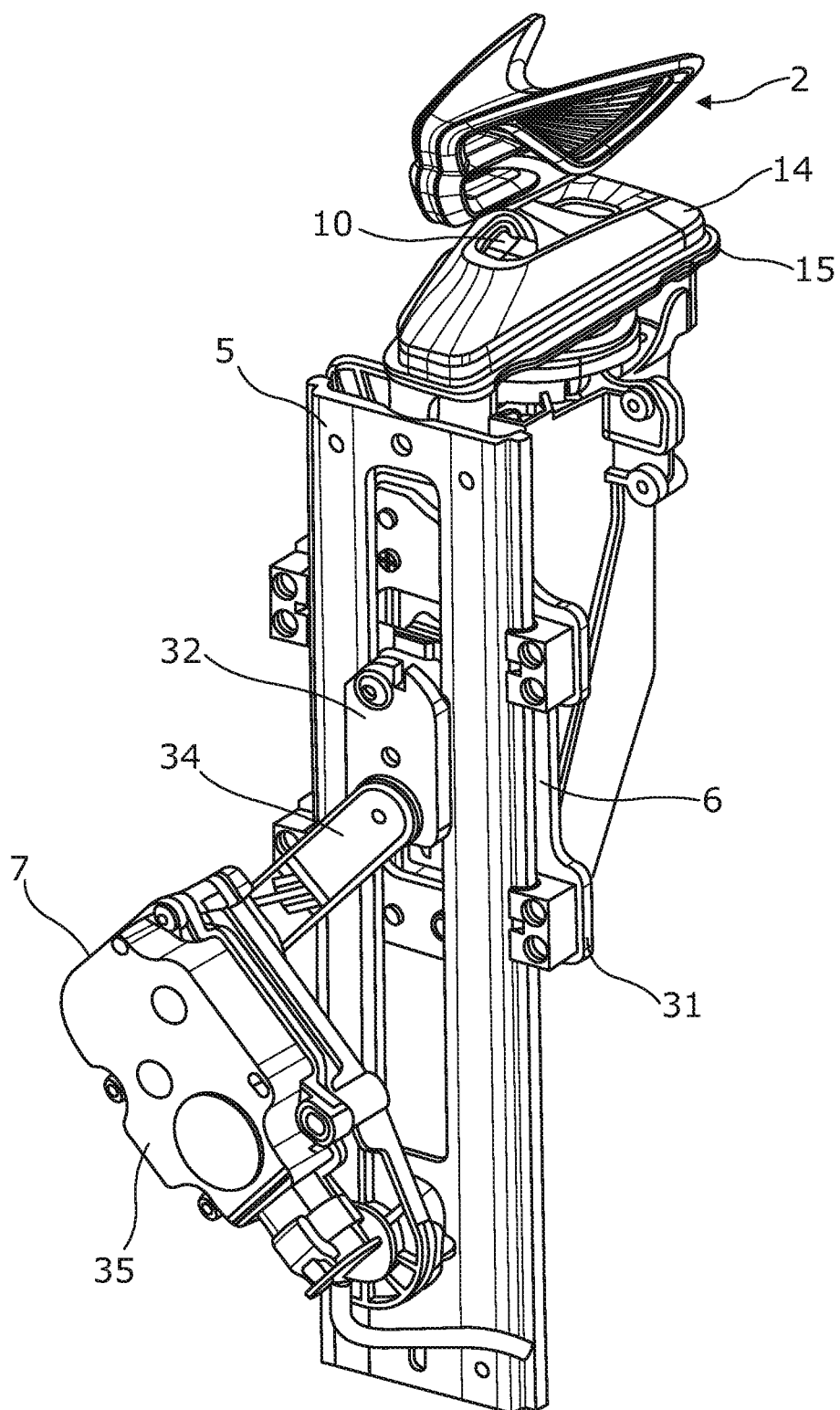
FIG. 8 is a perspective view of the mechanism of FIG. 1 mounted to a track and drive mechanism.
Figure 9:
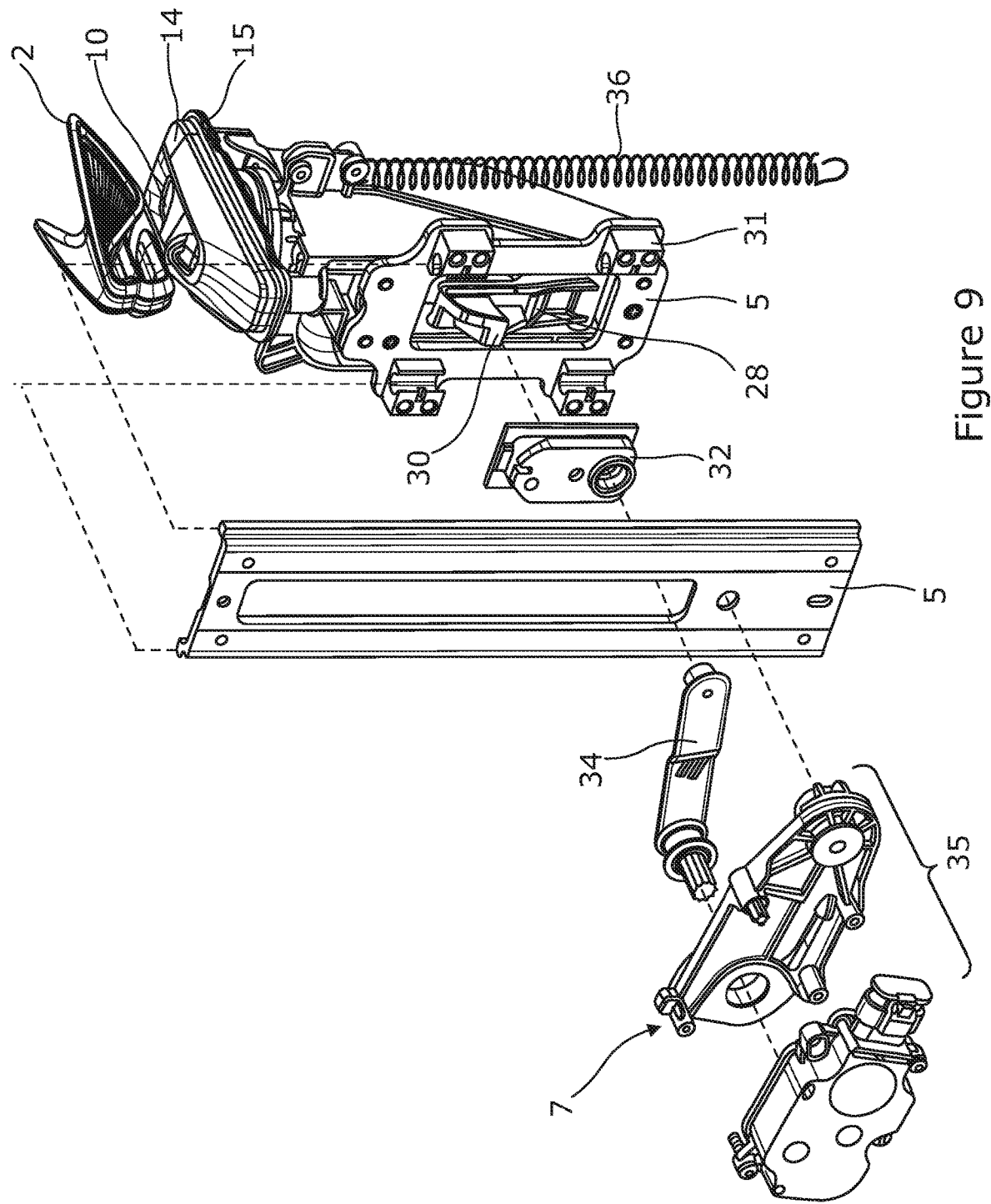
FIG. 9 is a partially exploded perspective view of the arrangement of FIG. 8.

If, whilst deployed, the mascot 2 is subjected to a sufficient lateral force in any direction, and as shown for example in FIG. 2, the mascot tilts causing a circular or substantially circular edge of the pivot member 17 to pivot against the ring 16 of the plinth 14 and the top of the plunger 22. The base 10 of the mascot 2 tilts with the mascot, the downwardly moving part of the base moving into the clearance between the base 10 and the top of the ring 16 but remaining clear from contact with the plinth 14. Pivoting of the pivot member 17 forces the plunger 22 downwards against the action of the spring 24. In turn this causes the push rod 25 to depress the bell crank 26 and moves the latch member 30 out of the recess 33 in the carriage 32. This releases the support 6 from the carriage 32 allowing it to travel freely down the track under the combined influence of gravity and the retraction spring 36. This retracts the mascot 2 and during the final movement of the support to its lowermost position closes and locks the cover 4. The mascot 2 is therefore quickly retracted in the event of it colliding with a person or object or being tampered with.

In this state the support 6 has descended the bottom of the track 5 whilst the carriage 32 remains at the top. To deploy the mascot 2 again the motor is operated to drive the carriage 32 to the bottom of the track 5. As the carriage 32 contacts the angled side of the latch member 30 it will deflect the latch member 30 against the spring 29. This allows the carriage 32 to pass over the latch member 30 until it reaches its lowermost position where the latch member will be urged into the recess 33 by the spring 29. Provision of two differently sloping surfaces to the upper side of the latch member facilitates its return to the recess, whilst reducing the risk of it coming out of the recess without the latch member being retracted. The motor can then be reversed to drive the carriage 32 upwards, this time together with the support 6. This motion can be achieved by a user selecting the mascot 2 to a stowed position before re-selecting a deployed position. Or, a detector, such as a micro switch, could be employed to detect when the latch member 30 is released and in response cause the motor to drive the carriage to its lowermost position to re-engage with the support 6 ready to re-deploy the mascot 2 when required.

An alternative embodiment of a mascot retraction mechanism 1 is shown in FIGS. 21-25. In this embodiment, the mascot 2 also has the form of a capital letter B with two feathered wings, but is wholly opaque and not illuminated. The letter B is mounted to a generally hexagonal, coffin shaped, base with curved corners.

On the underside of the base 2 there is a slightly raised, flat, substantially circular region 46 from the centre of which extends a projecting tapering formation with a square cross-section with rounded corners 47 with an aperture extending there through.

The mascot 2 is mounted to a plinth 14 which is fastened to a support 6. The plinth 14 has an opening in its top surface of the same shape as the base 10 of the mascot 10, and sized to accommodate the base 10 so that it is flush with the adjacent surface of the plinth 14 with a small clearance all around. The opening opens into a recess. A square aperture with rounded corners is formed through the base of the recess and opens into a counter bore. A flat topped wall 48 with a substantially circular outside edge extends around and defines the square aperture at the end of the bore. The support 6 includes a bore 49 which mates up to the counter bore in the plinth.

The formation 47 is sized to be received into the square aperture in the plinth 14 and positioned so that when so received it orientates and locates the mascot 2 so that its base 10 is correctly located laterally within the corresponding shaped aperture in the base with the raised circular region 46 on the mascot centred on an supported by the wall 48 and so correctly locating the base 10 vertically relative to the plinth.

A link rod 50 extends through an aperture in the formation 47 and connects to an aperture through the top end of a cylindrical plug 51 disposed in the bore 49. Towards the bottom of the plug its diameter increases in a step to form a shoulder and a compression spring 52 extends over the plug between the shoulder and the end of the counter bore in the plinth 14 and biases the base 10 downwards, urging the circular region 46 into contact with the wall 48.

Towards the bottom of the plug 51 is a second aperture. A cable 53 extends through this aperture, and then downwards out of the bottom end of the bore in the support 6 into a sheath connected to the support 6. The sheathed cable then extends counter-clockwise around a circular guide as it operatively connected a release lever 54.

The support 6 is mounted to a fixed mounting 55, by upper and lower arms 56 each pivotally connected to the support 6 and mounting 55 to form a parallel linkage which enables the support to move from a raised mascot deployed position as shown in FIG. 21 to a lowered mascot stowed position. Owing to the parallel linkage the support will remain upright whilst moving in an arc between the two positions.

The release lever 54 is pivotally mounted to the lower arm of the parallel linkage at a point about one third of the way from the point where the arm is connected to the mounting 55 to the point where it is connected to the support 6. Its free end forms a hook which can engage over a rod 57 extending from the pivotal connection of the upper arm to the mounting 55 when the arrangement is in the mascot deployed position. This ties the two arms of the parallel linkage together, locking the arrangement in the mascot deployed position.

The cable sheath is connected to the mounting 55 and the cable to the release lever 54 at position displaced from its pivot point to the opposite side of the lever to the hook, such that retracting the cable into the sheath will cause the release lever 54 to move away from the rod 57.

In use, when a sufficient lateral force is applied to the mascot 2, in any direction, as shown in FIG. 21, the base 10 at the edge of the substantially circular region 46 will pivot upon the edge of the raised circular region 46 moving against the top of the wall 48. This is permitted by the recess in the plinth 14 allowing part of the base 10 to move into the recess. This pivoting urges the link rod 40 upwards in turn moving the plug 51 against the action of the spring 52 and drawing the cable 53 through its sheath into the bore 49 in the support 6. This rotates the release lever 54, disengaging it from the rod 57 allowing the arms 56 to move and thus the support to move downwards under the influence of gravity to move the mascot 2 to a stowed position. A spring and/or damper assembly 58 acting between the support 6 and mounting 55 may enhance and/or control this motion.

This embodiment may be provided with an actuator to return the mascot 2 to the deployed position or this may be achieved manually.

The one or more embodiments are described above by way of example only. Many variations are possible without departing from the scope of protection afforded by the appended claims.

The invention claimed is:

1. A mascot and mascot retraction mechanism assembly comprising a mascot and a support, the mascot comprising a mascot base and a contact area with a substantially circular edge, the base extending over and concealing the contact area in use, and the support comprising a support surface and an arrangement for resiliently biasing the contact area of the mascot base into contact with the support surface and permitting the mascot and mascot base to pivot relative to the support about the substantially circular edge, wherein the mascot base has a non-circular outline shape.

2. A mascot and mascot retraction mechanism assembly as claimed in claim 1 wherein the mascot base has a generally polygonal shape.

3. A mascot and mascot retraction mechanism assembly as claimed in claim 1 wherein the mascot base is elongate.

4. A mascot and mascot retraction mechanism assembly as claimed in claim 1 wherein the substantially circular edge has an angular profile.

5. A mascot and mascot retraction mechanism assembly as claimed in claim 1 wherein the substantially circular edge has a curved profile.

6. A mascot and mascot retraction mechanism assembly as claimed in claim 1 wherein the contact area and/or the support surface is annular or circular.

7. A mascot and mascot retraction mechanism assembly as claimed in claim 1 wherein the substantially circular edge is formed integrally with the mascot base.

8. A mascot and mascot retraction mechanism assembly as claimed in claim 1 wherein the substantially circular edge is comprised in a pivot member connected to the mascot base.

9. A mascot and mascot retraction mechanism assembly as claimed in claim 1 comprising respective co-operating formations associated with the mascot base and the support which cooperate to locate the mascot base in a desired position relative to the support when the contact area is biased into contact with the support surface.

10. A mascot and mascot retraction mechanism assembly as claimed in claim 1 wherein the support comprises an aperture of corresponding shape to the outline shape of the mascot base, and arranged so that the mascot base is located in and/or aligned with the aperture when the contact area is biased into contact with the support surface.

11. A mascot and mascot retraction mechanism assembly as claimed in claim 10 wherein a clearance is provided between an edge of the mascot base and the aperture, and beneath the mascot base and the support, when the contact area is biased into contact with the support surface to permit the mascot base to pivot relative to the support about the substantially circular edge.

12. A mascot and mascot retraction mechanism assembly as claimed in claim 10 wherein the support comprises a plinth and the aperture is formed in the plinth.

13. A mascot and mascot retraction mechanism assembly as claimed in claim 1 arranged so that pivoting of the mascot base relative to the support causes the mechanism to retract the mascot.

14. A mascot and mascot retraction mechanism assembly as claimed in claim 13 wherein the mascot base is connected to or urged into contact with a member such that pivoting of the mascot base causes movement of the member, the member being operatively connected to a latch such that movement of the member causes the latch to release, and release of the latch permits the support to move from a mascot deployed position to a mascot retracted position.

15. An automobile comprising a mascot and mascot retraction mechanism assembly, the mascot and mascot retraction mechanism assembly comprising a mascot and a support, the mascot comprising a mascot base and a contact area with a substantially circular edge, the base extending over and concealing the contact area in use, and the support comprising a support surface and an arrangement for resiliently biasing the contact area of the mascot base into contact with the support surface and permitting the mascot and mascot base to pivot relative to the support about the substantially circular edge, wherein the mascot base has a non-circular outline shape.

* * * * *